Aug. 30, 1932.   L. G. STECKER   1,875,275
GRID PASTING MACHINE
Filed Aug. 24, 1929   4 Sheets-Sheet 1
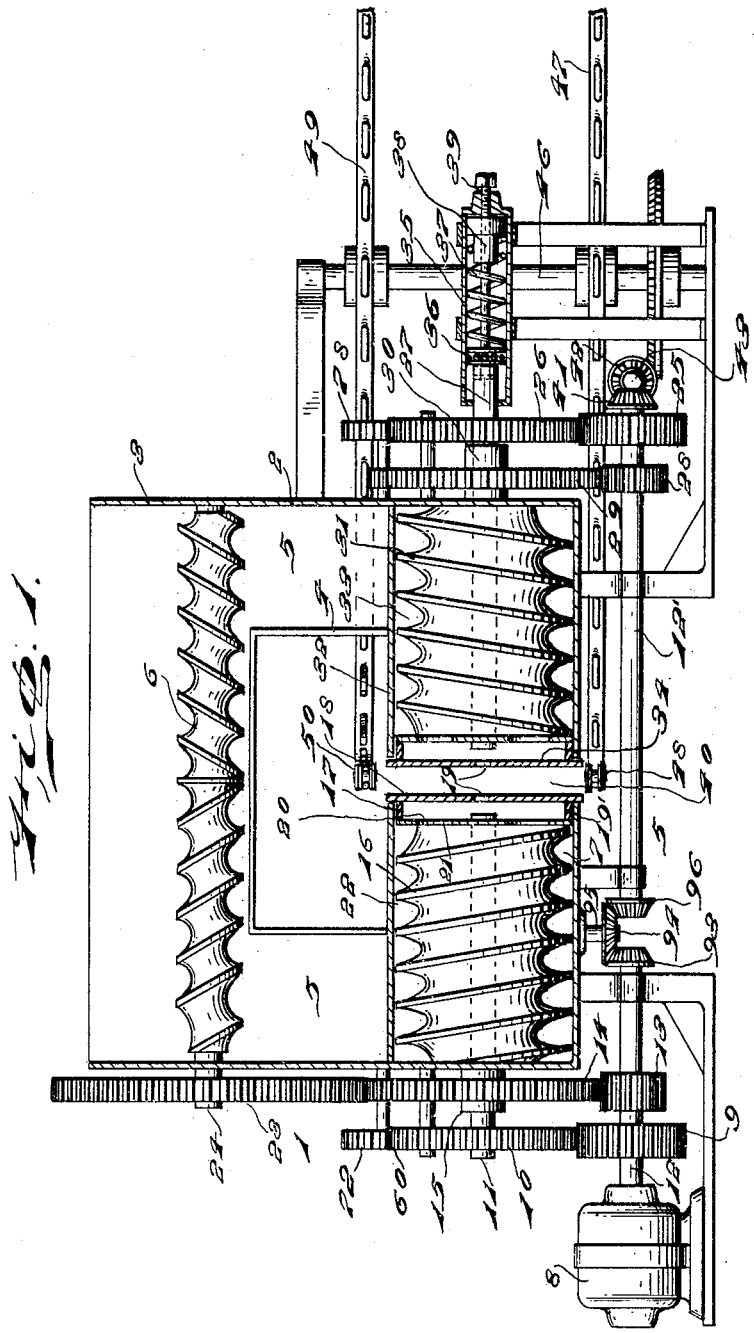
INVENTOR.
Louis G. Stecker
BY
Herbert S. Fairbanks
ATTORNEY.

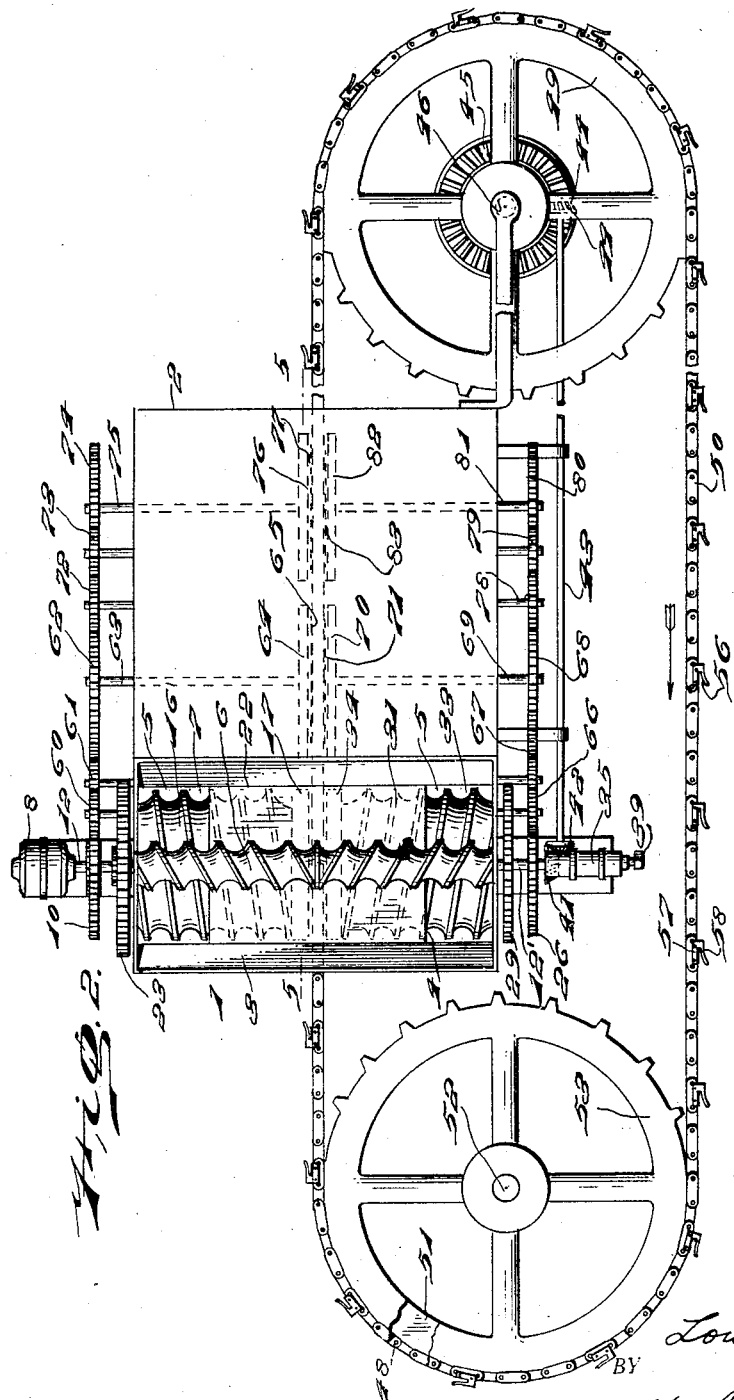

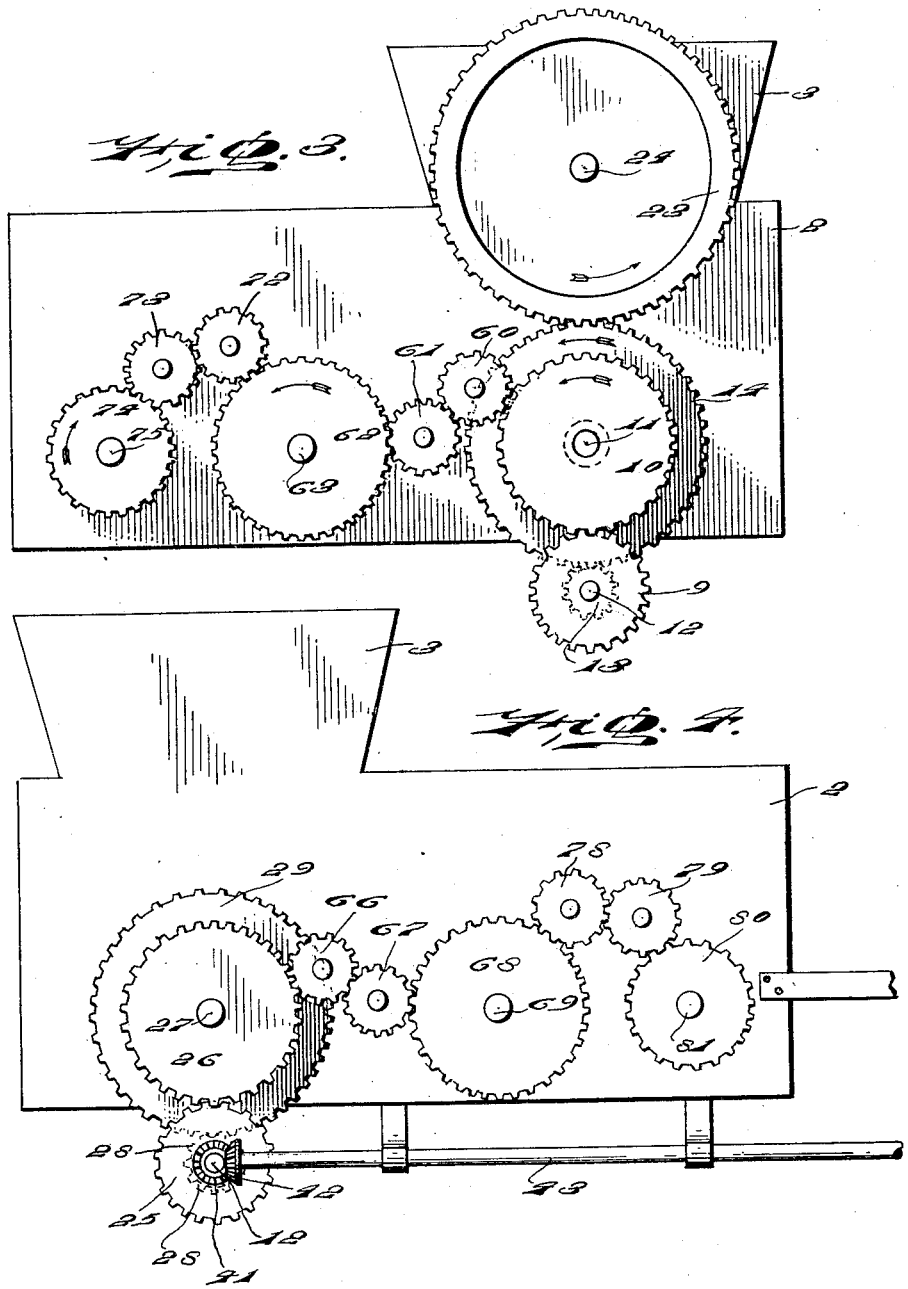

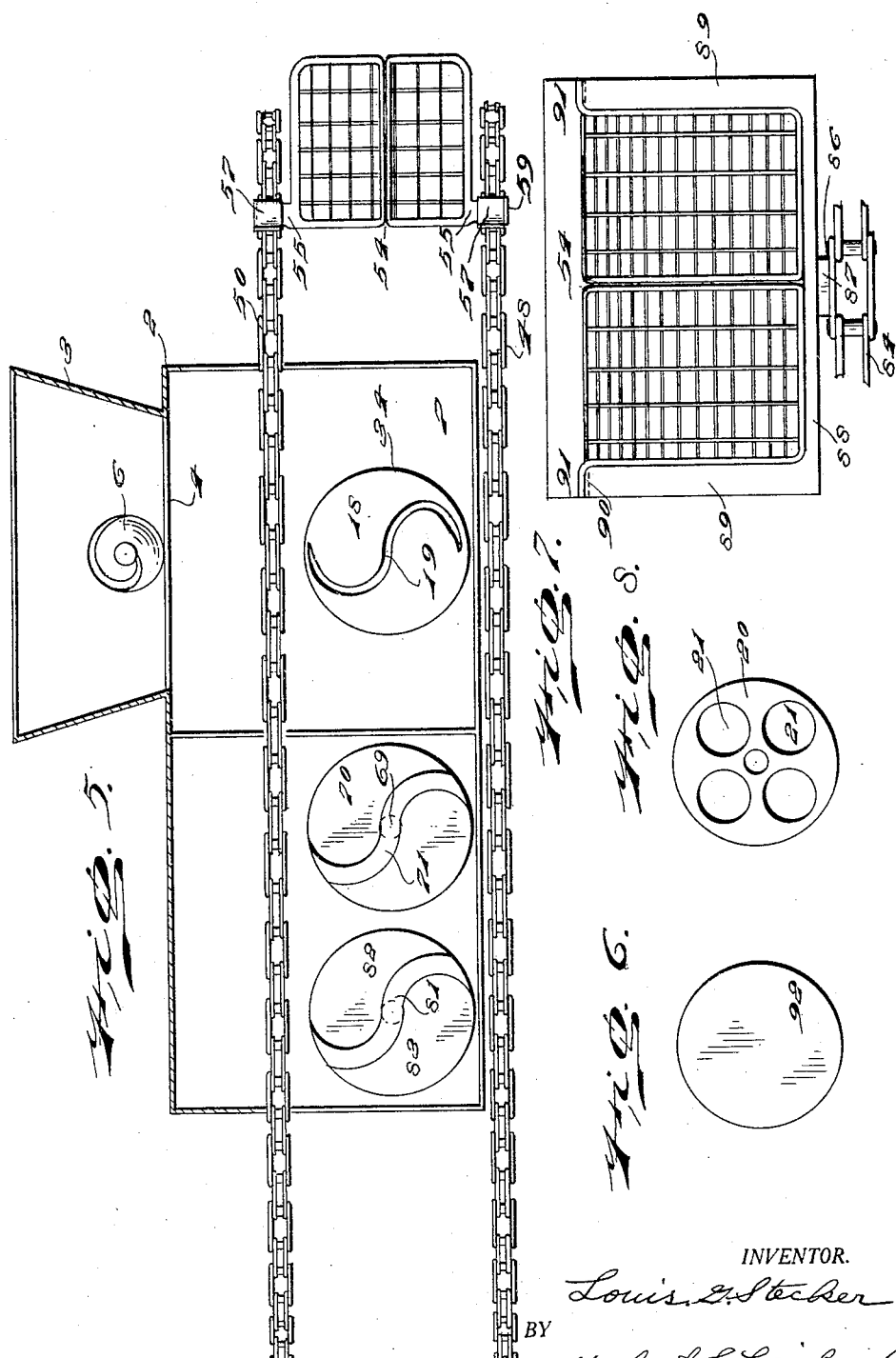

Patented Aug. 30, 1932

1,875,275

UNITED STATES PATENT OFFICE

LOUIS G. STECKER, OF PHILADELPHIA, PENNSYLVANIA

GRID PASTING MACHINE

Application filed August 24, 1929. Serial No. 388,190.

In the manufacture of grids such as are employed for the plates of secondary battery a cellular lead grid has its cells filled with active material which is ordinarily called paste and in order to secure the proper chemical action at all points of the surface of the plate it is necessary that the paste forms a homogenous mass which is firmly packed in the cells.

The object of this invention is to devise a novel grid pasting machine and novel means for filling the cells in the grids by simultaneously pressing the material into the grids from opposite sides of such grids through a slot or openings in a revolving member which serves not only as a feeding member but also serves to compress the past into the cells and as the pressure from opposite sides is uniform the material is properly packed within the cells so that the entire space is filled with active material.

A further object of the invention is to devise novel means for automatically conveying the grids into and from pasting position in order to obtain a maximum output from the machine.

With the above and other objects in view, as will hereinafter more clearly appear, my invention comprehends a novel grid pasting machine and a novel method of automatically applying the paste to the grids.

It further comprehends a novel grid pasting machine wherein the material is fed from a hopper to paste feeding members located on opposite sides of the path of travel of a grid and novel feeding members which revolve at a different speed from that of the feed members and feeds the paste into cells of the grid.

It further comprehends a novel construction and arrangement of revoluble feed members and novel means for driving them.

It further comprehends a novel construction and arrangement of a conveyor.

It further comprehends a novel method of and apparatus for feeding paste to the grids through a feed slot in a revolving member.

Other novel features of construction and advantage will hereinafter clearly appear in the detailed description and the appended claims.

For the purpose of illustrating the invention, I have shown in the accompanying drawings typical embodiments of it, which, in practice, will give reliable and satisfactory results. It is, however, to be understood that these embodiments are typical only and that the various instrumentalities of which my invention consists can be variously arranged and organized, and the invention is not limited to the precise arrangement and organization of these instrumentalities as herein set forth.

Figure 1 is a sectional elevation of a grid pasting machine and illustrative of a method of pasting grids embodying my invention.

Figure 2 is a top plan view of the grid pasting machine.

Figure 3 is a side elevation of a portion of the machine showing more particularly the gearing.

Figure 4 is a side elevation viewed from the opposite side of that seen in Figure 3.

Figure 5 is a section on line 5—5 of Figure 2.

Figure 6 is an elevation of a disc or baffle which may be employed.

Figure 7 is a side elevation of a grid holder and a single feeding chain for feeding it, the grid being shown in assembled position.

Figure 8 is a plan view of a disc of a feed member.

Similar numerals of reference indicate corresponding parts.

Referring to the drawings:—

1 designates a grid pasting machine embodying my invention and illustrative of one manner in which my novel method can be carried out in practice.

The machine is provided with a paste receiving casing 2 having any desired contour and this casing may be supported on any desired type of framework or may be adapted to be placed on a table or other support. I have therefore deemed it unnecessary to illustrate and describe any supporting framework.

The paste receiving casing 2 is provided with a hopper 3 in which is located a partition 4 which contributes with the juxtaposed walls of the casing to form at opposite ends the downwardly directed feed passages 5. The hopper 3 has mounted in it a feed screw 6 which feeds the material from the central portion of the hopper towards and into the feed passages 5. It will be seen that this feed screw has its screw portions reversely inclined so that the material will be fed through the passages 5 to a filling chamber 7. The machine is driven by means of a motor 8 preferably an eletric motor, the shaft of which is provided with a pinion 9 which meshes with a gear 10 fixed to a shaft 11. The shaft 12 of the motor is suitably journalled and has fixed to it a pinion 13 which drives a gear 14 fixed to a sleeve 15 which extends into the filling chamber 7 and drives a compressor screw 16 which is fixed to the sleeve 15.

The shaft 11 extends through the compressor screw 16 and at its outer end has fixed to it a feed member 17 which is fixed to the shaft 11 to be driven by it. The feed member 17 is provided with a flanged disc 18 having a feed slot 19 extending from one periphery of the disc 18 towards the opposite periphery. This disc 18 has the laterally extending annular flange 19′ within which is fixed a disc 20 which is provided with apertures 21 through which the paste is fed from the filling chamber 7 which is formed within the circular casing 22.

The gear 14 drives a gear 23 fixed to the shaft 24 which drives the feed screw 6. At the opposite side of the machine the shaft 12′ is provided with a gear 25 which meshes with a gear 26 fixed to a shaft 27. The shaft 12′ is also provided with a gear 28 which meshes with a gear 29 on the shaft 30 to which is fixed a compressor screw 31 mounted in the casing 32 which communicates with a feed passage 5 and is provided with a chamber 33. The shaft 27 at its inner end has fixed to it a feed member 34 similar in construction to the feed member 17 and operating in the same manner, and, as the feed member has already been described in detail and is of the same construction, the same reference characters have been applied to both of these feed members, it being understood, as will hereinafter be clearly brought out, that in some cases arising in practice it is only necessary to use one of these feed members and the other feed member would be replaced by an imperforate disc or baffle.

I provide means for causing relative movement towards each other of the feed members 17 and 34 and for this purpose the shaft 27 extends into a casing 35 within which is located a thrust bearing 36 which bears against the outer end of the shaft 27. A spring 37 is interposed between the thrust bearing 36 and a collar 38 slidably mounted in the casing 35. An adjusting screw 39 is provided in threaded engagement with the shaft 27 and passing through the collar 38 in order to limit inward movement of member 34. The feed members 17 and 34 form between them a slot 40 through which the grids are automatically fed as will now be described.

The shaft 12′ is provided with a gear 41 which meshes with a gear 42 on a shaft 43 suitably journalled and provided at its outer end with a bevel gear 44 which meshes with a bevel gear 45 fixed to a shaft 46 on which is mounted a sprocket wheel 47 around which passes a conveyor chain 48. In some cases a single chain may be employed and in other cases two chains would be employed the shaft 46 having secured to it an upper sprocket wheel 49 around which passes a conveyor chain 50. The conveyor chain 48 also passes around a sprocket wheel 51 fixed to a shaft 52 to which is fixed an upper sprocket 53 around which passes the upper conveyor chain 50.

54 designates a conventional grid having the lugs 55 which are received in the recesses 56 in the grid carriers 57 which are longitudinally spaced along the conveyor chains to receive the grids. In order to facilitate the assembly of the grids with the grid carriers 57, the grid carriers are provided with the laterally extending curved arms 58 which form spring clips to resiliently hold the grids in place during the feeding operation. The lowermost grid clip is of the same construction but is provided with a plate 59 which closes the bottom of its slot. After the grids are filled they pass between two sets of revolving discs which remove any excess material and compress and polish the paste in the cells of the grid.

The gear 10, see Figure 3, meshes with an idler 60 which meshes with an idler 61 which in turn meshes with a gear 62 mounted on a shaft 63 suitably journalled in the casing of the machine and this shaft at its outer end has fixed to it a polishing disc 64 which is provided with a rib 65 which preferably has an S shape contour. The gear 26 at the opposite side of the machine meshes with an idler 66, see Figure 4, which in turn meshes with an idler 67 which latter meshes with a gear 68 mounted on a shaft 69 journalled in the machine frame. This shaft 69 has fixed to it a polishing disc 70 the operative face of which is provided with a raised rib 71 which preferably is S shape in contour.

I also provide a second set of polishing discs. Referring now to Figure 3 it will be seen that the gear 62 meshes with an idler 72 which in turn meshes with an idler 73 and the idler 73 meshes with a gear 74 fixed to a shaft 75 suitably journalled in the machine casing. The shaft 75 has fixed to it a polishing disc 76 having a raised rib 77 on its operating face.

In a similar manner the gear 68 meshes with an idler 78 which in turn meshes with an idler 79. The idler 79 is in mesh with a gear 80 fixed to a shaft 81 and the shaft 81 has fixed to it a polishing disc 82 having on its operative face a raised rib 83.

In some cases arising in practice instead of feeding the paste into the cells of the grids from opposite sides of the grid the feed member 17, for example, can be replaced by a baffle or imperforate disc 92 such as seen in Figure 6, and the feed screw 16 in such case may be dispensed with.

In some cases it is not necessary to employ an upper and lower conveyor chain and the grid holder and conveyor chain seen in Figure 7 can be employed in which the conveyor chain 84 is driven in a similar manner to the lower conveyor chain 38, seen in Figure 2.

The sections of the chain 85 seen in this figure are provided with a recess 86 to receive a lug 87 of a grid holder 88 which is provided with the upwardly extending sides 89 which at their upper ends are provided with the V shaped grooves 90 to receive the lugs 91 of a grid 54.

The motor shaft 12 has fixed to it a bevel gear 93 which meshes with a bevel gear 94 mounted on a stud shaft 95. The bevel gear 94 meshes with a bevel gear 96 fixed to the shaft 12$^1$. This causes the feed member and polishing members on one side of the path of travel of the grids to revolve in the opposite direction to the direction of rotation of the feed members and polishing members on the opposite side of such path of travel of the grids.

In the operation and in carrying out in practice my novel method, the paste is placed in the hopper 3 and is fed by the feed screw 6 from the central portion of the hopper to the two feed passages 5 and to the chambers 7 and 33. The feed screws 16 and 31 revolve in opposite directions and feed the paste towards the slot 40. The grids 92 are placed in their spring clips 58 and are automatically advanced by the conveyor. The feed members 17 and 34 revolve in opposite directions and at a higher speed than that of the feed screws 16 and 31. The paste is fed under pressure through the apertures 21 into the chambers of the revolving feed members 17 and 34 and therefrom through the feed slots 19 into the cells of a grid. The paste is thus fed into the cells in the form of a revolving stream. The jutaposed faces of the discs 18 of the feed members 17 and 34 distribute and pack the paste into the cells so that each cell is completely filled with a homogeneous mass of paste. The grids after being filled are subjected to the action of the finishing and polishing members. The filled grids are then removed from the conveyor and unfilled grids attached to the conveyor and the cycle of operation is repeated.

In case it is desired to fill the grids from only one side, a feed member 17 or 34 is replaced by a baffle 92 and the corresponding feed screw 16 or 31 may be disconnected from its drive. The third set of polishing members revolve in the opposite direction to that of the second set of polishing members. This enables one to obtain a better finish to the pasted grids.

In so far as I am aware I am the first in the art to paste grids in the manner herein disclosed and I therefore desire my claims to such features to receive the broad and generic interpretation to which a pioneer in the art is entitled.

What I claim and desire to secure by Letters Patent is:

1. In a grid pasting machine, means to feed the grids into pasting position, a revoluble member having a plate with a single feed slot through it and of greater length than the diameter of said member, means to feed paste through said feed slot, and means to revolve said member.

2. In a grid pasting machine, opposed revoluble members forming a slot to receive the grids, and one of said members having an S shaped feed slot in its face, means to feed paste to the feed slot, and means to revolve said members.

3. In a grid pasting machine, opposed members between which the grids are fed, one of said members having a feed slot through its face of greater length than the diameter of its member, means to feed paste through said slot and means to revolve one member in a different direction from that of the other member.

4. In a grid pasting machine, opposed revoluble feed members each having a slot across its face of greater length than the diameter of its member, means to feed paste to said members, means to revolve said members and means to feed grids between said members.

5. In a grid pasting machine a conveyor adapted to receive and carry the grids, opposed members between which the grids are fed by said conveyor, one of said members having a feed slot across its face of greater length than the diameter of its member, means to revolve one of said members in a different direction from that of the other member, means to feed paste to said feed slot, and means to revolve said feeding means at a different speed from the speed of revolution of said members.

6. In a grid pasting machine, opposed members one of which has a feed slot of greater length than the diameter of its member, means to yieldingly effect relative movement towards each other of said members, means to feed paste to said feed slot, and means to revolve said slotted member.

7. In a grid pasting machine, opposed members (between which grids are fed) one of which has two spaced discs forming a chamber, one of said discs having a single feed slot of greater length than the diameter of its disc and the other disc having openings, means to feed paste to said openings and thereby to said chamber and feed slot, and means to revolve the slot carrying member during the feeding operation.

8. In a grid pasting machine a paste receiving casing having two discharge passages, means to feed paste to said passages, opposed feed screws to feed the paste from said passages, shafts extending through said feed screws, juxtaposed feed members fixed to said shafts and between which grids are fed and having feed slots to which the paste is fed by said feed screws, one of said feed slots being of greater length than the diameter of its member and driving means to revolve said feed screws and said members.

9. In a grid pasting machine, opposed members between which the grids are fed, one of said members having a feed opening of greater length than its diameter, means to feed paste under pressure to said feed opening, and means to revolve the member with the feed opening.

LOUIS G. STECKER.